(12) United States Patent
Irwan et al.

(10) Patent No.: US 10,666,446 B2
(45) Date of Patent: May 26, 2020

(54) DECENTRALIZED ENROLLMENT AND REVOCATION OF DEVICES

(71) Applicant: XAGE SECURITY, INC., Palo Alto, CA (US)

(72) Inventors: Susanto Junaidi Irwan, San Francisco, CA (US); Ganesh B. Jampani, Gilroy, CA (US); Andy Sugiarto, Moraga, CA (US); Jeffrey Charles Venable, Sr., Union City, CA (US); Roman Arutyunov, San Jose, CA (US)

(73) Assignee: Xage Security, Inc., Palo Alto, CA (US)

( * ) Notice: Subject to any disclaimer, the term of this patent is extended or adjusted under 35 U.S.C. 154(b) by 350 days.

(21) Appl. No.: 15/813,493

(22) Filed: Nov. 15, 2017

(65) Prior Publication Data
US 2019/0245699 A1 Aug. 8, 2019

(51) Int. Cl.
*H04L 29/08* (2006.01)
*H04L 9/32* (2006.01)
(Continued)

(52) U.S. Cl.
CPC .......... *H04L 9/3268* (2013.01); *H04L 9/0618* (2013.01); *H04L 9/0894* (2013.01); *H04L 9/3239* (2013.01); *H04L 29/08* (2013.01); *H04L 63/0281* (2013.01); *H04L 63/0823* (2013.01); *H04L 63/166* (2013.01); *H04L 2209/38* (2013.01); *H04L 2209/805* (2013.01)

(58) Field of Classification Search
CPC ... H04L 9/3268; H04L 9/0618; H04L 9/0894; H04L 9/3239; H04L 29/08; H04L 63/0281; H04L 63/0823; H04L 63/166; H04L 2209/38; H04L 2209/805
See application file for complete search history.

(56) References Cited

U.S. PATENT DOCUMENTS

| 6,675,296 B1 * | 1/2004 | Boeyen .................. H04L 9/3263 713/156 |
| 9,130,837 B2 * | 9/2015 | Bjarnason ........... H04L 41/0809 |

(Continued)

OTHER PUBLICATIONS

Zhang et al., "The IoT Electric Business Model: Using Blockchain Technology for the Internet of Things", In Peer to Peer Networking and Applications, dated Apr. 13, 2016, 12 pages.

(Continued)

*Primary Examiner* — Joseph P Hirl
*Assistant Examiner* — Stephen T Gundry
(74) *Attorney, Agent, or Firm* — Hickman Palermo Becker Bingham LLP; Tina T. Wang

(57) ABSTRACT

In an embodiment, a computer-implemented method comprises, receiving, at a first server, a plurality of certificates and an inventory list and storing the plurality of certificates and the inventory list in a blockchain; receiving, at a second server associated with the blockchain, a validation request from a device and validating the device; in response to validating the device, receiving, at the second server, a certificate request from the device and verifying the certificate request against the inventory list stored in the blockchain; and in response to verifying the certificate request, enrolling the device by sending a certificate from the plurality of certificates stored in the blockchain to the device.

23 Claims, 4 Drawing Sheets

(51) Int. Cl.
*H04L 9/06* (2006.01)
*H04L 9/08* (2006.01)
*H04L 29/06* (2006.01)

(56) References Cited

U.S. PATENT DOCUMENTS

| | | | |
|---|---|---|---|
| 9,635,000 B1* | 4/2017 | Muftic | H04L 9/14 |
| 9,858,781 B1* | 1/2018 | Campero | G07C 9/00 |
| 2005/0021942 A1* | 1/2005 | Diehl | H04N 7/163 |
| | | | 713/158 |
| 2009/0158029 A1* | 6/2009 | Wheeler | G06F 21/32 |
| | | | 713/155 |
| 2012/0084252 A1* | 4/2012 | Zha | G06F 16/256 |
| | | | 707/600 |
| 2014/0258711 A1* | 9/2014 | Brannon | G06F 21/606 |
| | | | 713/156 |
| 2016/0098723 A1* | 4/2016 | Feeney | G06Q 20/4016 |
| | | | 705/75 |
| 2016/0119287 A1* | 4/2016 | Khazan | H04W 12/02 |
| | | | 726/12 |
| 2016/0149869 A1* | 5/2016 | Selander | H04L 9/14 |
| | | | 713/176 |
| 2016/0275461 A1* | 9/2016 | Sprague | G06Q 20/0655 |
| 2016/0294783 A1* | 10/2016 | Piqueras Jover | H04L 63/0442 |
| 2016/0337341 A1* | 11/2016 | Purusothaman | H04L 63/0823 |
| 2017/0041296 A1* | 2/2017 | Ford | H04L 63/0421 |
| 2017/0094509 A1* | 3/2017 | Mistry | H04W 12/0609 |
| 2017/0134280 A1* | 5/2017 | Davis | G06Q 20/10 |
| 2017/0195331 A1* | 7/2017 | Wu | G06F 3/04845 |
| 2017/0250972 A1* | 8/2017 | Ronda | H04L 9/08 |
| 2018/0183587 A1* | 6/2018 | Won | G06F 21/44 |
| 2018/0254898 A1* | 9/2018 | Sprague | H04L 9/0866 |
| 2019/0036906 A1* | 1/2019 | Biyani | H04L 63/20 |
| 2019/0058713 A1* | 2/2019 | Pala | H04L 63/105 |
| 2019/0075099 A1* | 3/2019 | Brouchier | H04L 63/166 |
| 2019/0132299 A1* | 5/2019 | Tucker | H04L 9/0822 |
| 2019/0245856 A1* | 8/2019 | Irwan | H04L 63/105 |
| 2019/0288843 A1* | 9/2019 | Bonnell | H04L 9/32 |
| 2019/0349426 A1* | 11/2019 | Smith | H04L 69/22 |

OTHER PUBLICATIONS

The International Searching Authority, "Search Report" in application No. PCT/US2018/056555, dated Jan. 3, 2019, 16 pages.
Current Claims in application No. PCT/US2018/056555, dated Jan. 2019, 5 pages.

* cited by examiner

DECENTRALIZED ENROLLMENT AND REVOCATION OF DEVICES

TECHNICAL FIELD

The technical field of the present disclosure relates to improved methods, systems, computer software, and/or computer hardware in the field of data security. The disclosure relates more specifically to improved computer-implement methods and systems for providing decentralized security certificate enrollment and revocation. Certain embodiments are useful in regulating access to data of internet of things (IoT) devices and improving the resistance of networked IoT devices to attacks, unauthorized or malicious use, or malware.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The development and deployment of internet of things (IoT) devices has proceeded with remarkable speed in the past several years. IoT devices are diverse, including everything from controllers of industrial equipment to smart watches and personal activity monitors. However, security infrastructure has not kept pace with the huge number and wide use of these devices. Some analysts estimate that billions of such devices will be operating and connected to internetworks within a few years, but there is presently no effective security architecture that can efficiently permit IoT devices to be secured, yet readily usable. Key constraints in this technical field have included limited processing power, limited memory, and limited or absent user interface elements. All these characteristics of IoT devices make them difficult to integrate into existing client-server security systems. At the same time, misuse of IoT devices could be catastrophic by permitting an attacker or unauthorized user to gain control of industrial equipment or other systems that have embedded IoT devices.

In some security approaches a root certificate authority (CA) issues digital certificates to one or more certificate authorities, which are then authorized to issue other certificates to individual computing devices. This traditional approach requires that the various computing devices have access to the internet for requesting certificates directly from a CA. This centralized approach creates difficulties for decentralized deployment of IoT devices, where network connectivity is often not reliable enough to obtain signed certificates at the time of device registration. Decentralized approaches also face difficulties with data security while synchronizing sensitive information across multiple CA devices.

Thus, there is a need for decentralized certificate authority that securely enables enrollment and revocation of devices even in the absence of uninterrupted internet connectivity.

SUMMARY

The appended claims may serve as a summary of the invention.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
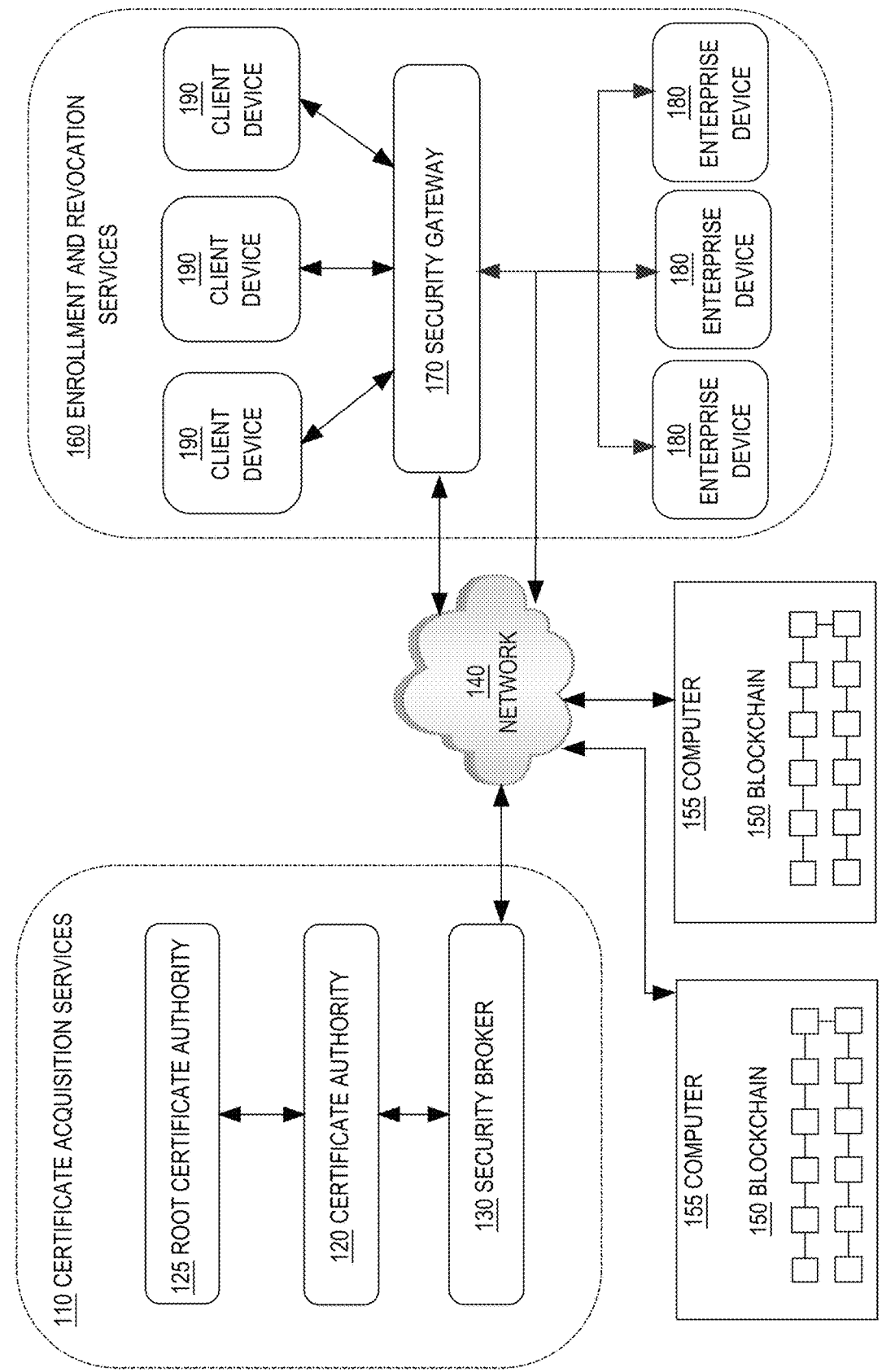
FIG. 1 illustrates a networked computer system, in an example embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein in sections according to the following outline:

1.0 General Overview
  2.0 Structural Overview
    2.1 Certificate Acquisition Services
    2.2 Blockchain Architecture
    2.3 Enrollment and Revocation Services
  3.0 Functional Overview
    3.1 Security Broker
    3.2 Blockchain Operations
    3.3 Security Gateway
  4.0 Procedural Overview
  5.0 Hardware Overview 1.0 General Overview According to various embodiments, computer-implemented methods and systems are provided that enable decentralized enrollment of IoT devices in a security regime, including issuing digital certificates, and revocation of certificates, via a security gateway and security broker. Embodiments offer the benefit of not requiring an internet connection at the time of device enrollment. Embodiments offer the benefit of not requiring a device to request a certificate directly from a centralized certificate authority. In embodiments, enrolling decentralized IoT devices that are deployed in various locations and with various internet availability becomes efficient and fast.

In embodiments, an intermediary broker is programmed to request digital certificates from a centralized certificate authority before device enrollment and to send the certificates and other related information to a blockchain that is accessible to an intermediary gateway. The intermediary gateway acts in place of the centralized certificate authority and performs enrollment and revocation services for IoT devices in a localized and decentralized manner, assuming relevant processing burdens. This approach also eliminates the need for uninterrupted internet connectivity and improves efficiency of network bandwidth usage. In some embodiments, the approach further increases resistance against malicious attacks on sensitive data using a blockchain to validate data. Moreover, the present approach can be extended to a plurality of IoT devices that are geographically distributed and separate from the enterprise environment, without implementing resource-intensive security software on or at each IoT device.

In an embodiment, a computer-implemented method comprises, receiving, at a first server, a plurality of certificates and an inventory list and storing the plurality of certificates and the inventory list in a blockchain. The method also comprises receiving, at a second server associated with the blockchain, a validation request from a device and validating the device. The method further comprises, in response to validating the device, receiving, at the second server, a certificate request from the device and verifying the certificate request against the inventory list stored in the blockchain. The method further comprises, in response to verifying the certificate request, enrolling the device by sending a certificate from the plurality of certificates stored in the blockchain to the device.

2.0 Structural Overview

FIG. 1 illustrates a networked computer system. In an embodiment, the computer system 100 comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments. A "computer" or "computing device" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" or "a computing device" herein may mean one or more computers, unless expressly stated otherwise. The instructions identified above are executable instructions and may comprise one or more executable files or programs that have been compiled or otherwise built based upon source code prepared in JAVA, C++, OBJECTIVE-C or any other suitable programming environment.

FIG. 1 illustrates only one of many possible arrangements of components configured to execute the programming described herein. Other arrangements may include fewer or different components, and the division of work between the components may vary depending on the arrangement.

In the example of FIG. 1, a networked computer system 100 may facilitate the secure exchange of data between programmed computing devices providing certificate acquisition services 110, devices providing enrollment and revocation services 160, and devices of a blockchain 150. Therefore, each of elements 110, 155, 160 of FIG. 1 may represent one or more computers that host or execute stored programs that provide the functions and operations that are described further herein in connection with certificate acquisition services, enrollment and revocation services, and blockchain operations. The methods and systems describe herein may be designed to accommodate a variety of different enterprises. Each enterprise may have its own security broker 130, blockchain 150, and/or security gateway 170 with settings that are customized to the preferences of each enterprise.

2.1 Certificate Acquisition Services

Certificate acquisition services 110 may be services that are programmatically offered by a security broker 130, including services for acquiring one or more certificates from a CA 120 for later enrollment. Typically, such services are delivered by executing control programs or application programs on computers and processing and responding to requests of computing devices using client-server digital message communications over networks based on defined protocols. The CA 120 may be a server authorized to enroll and issue certificates based on authorization received from a root CA 125. A root CA 125 and a CA 120 are often heavily protected to ensure certificate security and authenticity. Traditionally, a certificate request is sent directly from a requesting device to a centralized certificate authority, which then enrolls the requesting device and issues a signed certificate to the requesting device. Instead of this traditional approach, one embodiment of the current approach implements a decentralized CA approach using a security broker 130 and a security gateway 170, as further described herein, with significant technical benefits and improvements over past practice.

In an embodiment, the security broker 130 may be a computer, software and/or hardware or a combination storing instructions that are programmed or configured to receive an inventory list of devices that will eventually be enrolled. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. In another embodiment, the inventory list may be stored directly to a blockchain 150 from a manufacturer for subsequent access by the security broker 130.

Using the inventory list, the security broker 130 may be programmed to send certificate requests to a CA 120 based on the devices on the inventory list before any of the devices are onboarded. Subsequently, the security broker 130 may receive certificates from the CA 120 and, optionally, convert the certificates from a first format to a second format. By obtaining the certificates prior to device onboarding, the security broker 130 and the security gateway 170 may act as a decentralized CA that issues certificates in place of the CA 120. The security broker 130 may also receive a revocation list from the CA 120. The revocation list may indicate revocations of certificates for the devices on the inventory list. The certificates, the private keys associated with the certificates, the inventory list, and/or the revocation list may be stored in a database associated with the security broker 130. The security broker 130 may be programmed to hash and encrypt the certificates, the private keys associated with the certificates, the inventory list, and the revocation list, and send them over a network 140 to a blockchain 150.

Network 140 broadly represents a combination of one or more local area networks, wide area networks, global interconnected internetworks, such as the public internet, or a combination thereof. Each such network may use or execute stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein may be configured to connect to the network 140 and the disclosure presumes that all elements of FIG. 1 are communicatively coupled via network 140.

While each of the components listed above is illustrated as if located on a single computer, one or more of the components listed above may be part of and/or executed on different computers. For example, security broker 130 may be may be located on the same or a separate computer from the certificate authority 120.

2.2 Blockchain Architecture

The blockchain 150 may comprise blocks of linked data that are stored in an interconnected network of computers, with suitable stored programs at those computers to support ordered creation and transmission of blockchain data. Blockchain 150 forms a distributed database that maintains a continuously growing list of ordered records termed blocks that are timestamped and linked to a previous block. Each block in the series of blocks is linked together chronologically, with each new block containing a hash of the previous block. Each computer 155, or node, in a network of computers may store the entire record of linked data blocks. This creates a consensus network of computers that can verify the integrity of each block of data and the integrity of the entire blockchain 150. The consensus network has the benefit of having a high Byzantine fault tolerance, which is the ability of a computing system to tolerate Byzantine failures. As a result, the blockchain 150 functions as a distributed database that ensures the integrity of the data by utilizing hash functions to link each block to its previous block and storing the entire record of data blocks at each node.

2.3 Enrollment and Revocation Services

Enrollment and revocation services 160 may be computer-implemented services that are programmatically offered by a security gateway 170, including services for enrolling an enterprise device 180 or revoking certificates. Enterprise device 180 may be a computer, a virtual computer, and/or a computing device. A computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. The enterprise device 180 may be computer network devices such as gateways, modems, routers, wireless access points, switches, hubs, and firewalls. The enterprise device 180 may also be other IoT devices, which are physical devices with network connectivity capabilities that enables these physical devices to collect and exchange data. For example, enterprise device 180 may be an enterprise camera, temperature sensor, meter, or any other IoT device. The enterprise device 180 may also be specific users using a computer or IoT device. The enterprise device 180 may also be applications running on a computer or IoT device.

In an embodiment, the security gateway 170 may be a computer, software and/or hardware or a combination storing instructions configured to validate an enterprise device 180, receive a certificate request from the validated enterprise device 180, and perform enrollment and/or revocation services with or without uninterrupted interne access. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices.

The security gateway 170 may store data in the blockchain 150 data, and/or update a local database with data from the blockchain 150. For example, the security gateway 170 may store a copy of the certificates, inventory list, and/or revocation list in a local database by periodically checking the blockchain 150 for updated data. The security gateway 170 may also periodically update the blockchain 150 with the locally stored and updated information to the certificates, inventory list, and/or revocation list. The security broker 130 may be programmed to hash and encrypt the certificates, inventory list, and revocation list, and send them over a network 140 to a blockchain 150. In one embodiment, the security gateway 170 may be a separate device or program from the enterprise device 180, or it may be programmed to run inside the enterprise device 180 given adequate computing resources.

A client device 190 may be a computer, a virtual computer, and/or a computing device. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. The client device 190 may also be other IoT devices, which are physical devices with network connectivity capabilities that enables these physical devices to collect and exchange data. The client device 190 may also be specific users using a computer or IoT device. The client device 190 may also be applications running on a computer or IoT device.

3.0 Functional Overview

It will be apparent that the security broker 130 and the security gateway 170 represent a converged set of different technology foundations that have been combined in a new way. One purpose of the security broker 130 and the security gateway 170 is to provide decentralized CA services to an enterprise device 180 with or without uninterrupted internet access. Another purpose of the security broker 130 and the security gateway 170 is to provide a secure method of providing decentralized CA services with added blockchain 150 data validation and integrity. Thus, the security broker 130 and the security gateway 170 function as a secure, decentralized CA for validating devices, as well as obtaining and issuing certificates with or without uninterrupted internet access, as further described in other sections herein.

3.1 Security Broker

Figure 2:
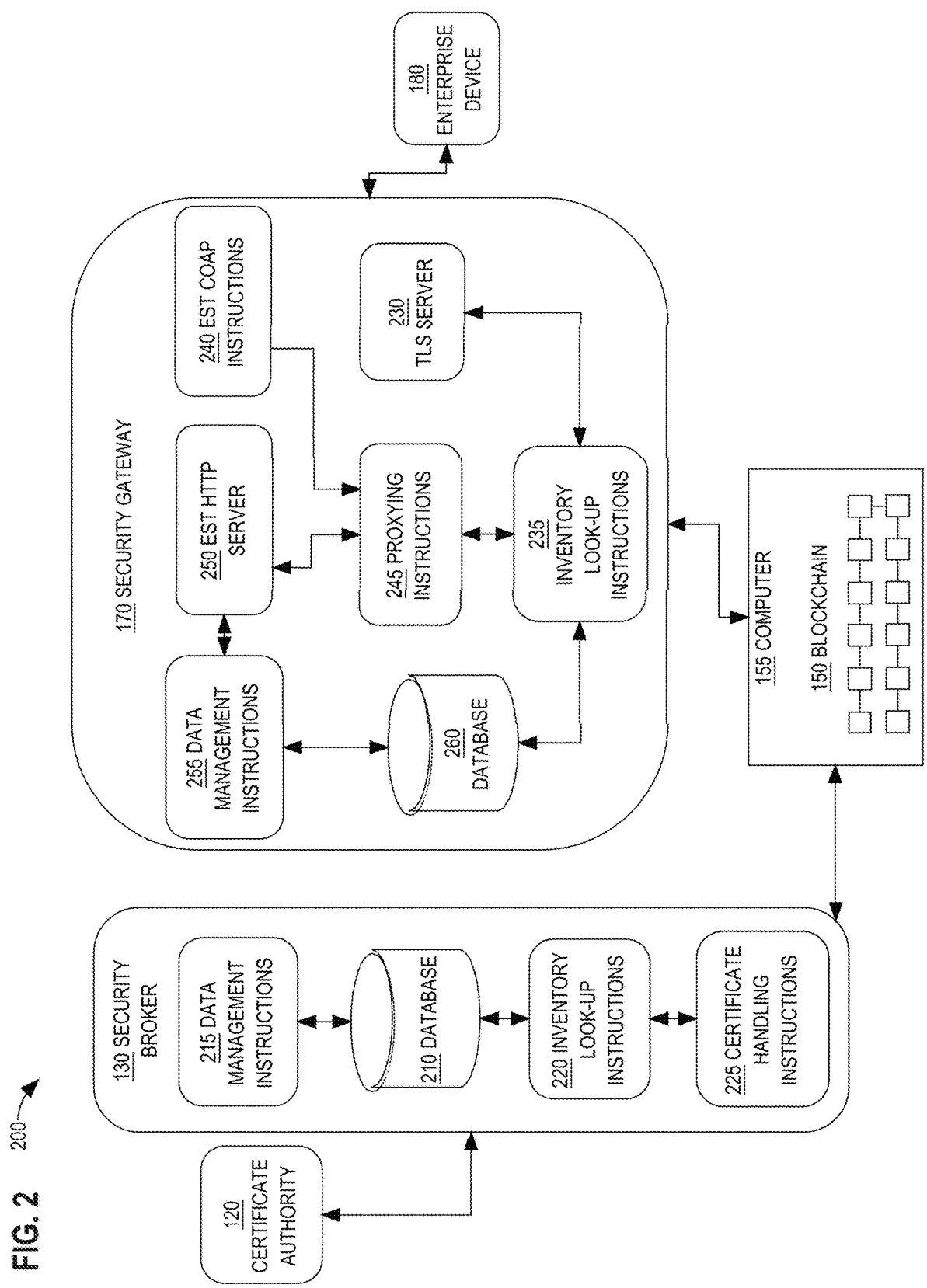
FIG. 2 illustrates a decentralized certificate authority system, in an example embodiment.

FIG. 2 illustrates a decentralized certificate authority system, in an example embodiment. The security broker 130 may use database 210 to store an inventory list of one or more enterprise devices that have not yet been enrolled. In another embodiment, the security broker 130 may access the inventory list stored in the blockchain 150 rather than storing the inventory list locally. The inventory list may comprise, for example, a list of manufacturer installed certificates (MIC) or birth certificates, device information, or any other unique identifiers (UID) of the enterprise devices that will be enrolled. The inventory list may be pre-programmed into the security broker 130 or obtained from the blockchain 150 or security gateway 170 through data management instructions 215, as further discussed herein.

The security broker 130 may use inventory look-up instructions 220 to access the inventory list stored in the database 210 and/or the blockchain 150 and determine how many enterprise devices, and which enterprise devices, will need certificates. The inventory list may be pre-programmed into the security broker 130, or obtained from the blockchain 150 or the security gateway 170, as further described herein. Once a total number of certificates are determined as needed, the certificate handling instructions 225 may request the total number of certificates and associated private keys from a CA 120.

In an embodiment, the certificate handling instructions 225 of the security broker 130 may request specific certificates with subject names for devices listed in the inventory list for early binding. In another embodiment, the security broker 130 may implement late binding by requesting generic certificates such that the certificate binding to specific devices occurs later. In an example embodiment, the security broker 130 may pre-allocate blocks of certificates for specific purposes, such as for specific types of devices. These generic certificates may include a generic or descriptive subject, or no subject at all. Each certificate may have a particular state associated with the certificate. The states may indicate, for example, that the certificate is active (i.e.—in service), allocated, or revoked. In an embodiment, a generic certificate that has been pre-allocated to a particular type of devices may have a status indicating that the certificate has been allocated but is not active or revoked. The certificate and status may be stored in the blockchain 150. In an embodiment, the specific purpose that the certificates have been pre-allocated for may be matched to an attribute featured in the Certificate Signing Request (CSR) received from the enterprise device 180 for each certificate during enrollment.

The CA 120 may be, for example, a Microsoft CA, or any other CA that has been authorized by a root CA 125. In response to the security broker 130 request, the CA 120 may send the requested certificates and private keys to the security broker 130 for conversion and subsequent storage in the database 210.

In an embodiment, the certificates received from the CA 120 may be in an initial format, such as the X.509 standard format. The certificate handling instructions 225 may convert the certificate from their initial formats to a different format, such as Public Key Cryptography Standard 7 (PKCS7). While PKCS7 may be one example format, any other format, including other PKCS formats, may be used. The converted certificates may, optionally, be stored in the database 210. In addition to the certificates, the security broker 130 may also receive, from the CA 120, a revocation list of the associated certificates, which may also, optionally, be stored in the database 210. Subsequently, the data management instructions 215 may hash and encrypt the converted certificates, revocation list, and the inventory list and send them to the blockchain 150.

3.2 Blockchain Operations

The blockchain 150 functions as a decentralized digital ledger that tracks numerous entries. Copies of the entire blockchain may be stored at each computer 155, or node, in a distributed network of interconnected computers of which FIG. 1 illustrates computer 155 with blockchain 150. In an embodiment, proposed entries to the blockchain 150 may be checked by a majority of the computers for verification. For example, if a new entry is generated for storage in the blockchain 150, the network of interconnected computers that also store copies of the blockchain 150 would first run algorithms to evaluate the hash value and verify the validity of the entry. If a majority of the computers agree that the entry is valid, then the entry will be added as a new block in the blockchain 150. As a part of a consensus network, blockchain 150 enforces high Byzantine fault tolerance; for example, a malicious attack attempting to alter the information in the blockchain 150 would need to control over 50% of the computers in the consensus network to alter the consensus. Since it would be exceedingly difficult to maliciously attack and maintain control over that many computers, the blockchain 150 data is better protected against malicious attacks than traditional methods of data storage.

The blockchain 150 may be used to securely store and transfer data for certificates, private keys, revocations lists, and inventory lists. Any data stored in the blockchain 150 may be replicated in the security broker database 210 and/or the security gateway database 260. For example, data initially received at the security broker 130 and stored in the database 210 may subsequently be stored in the blockchain 150 for replication to the security gateway database 260. In another embodiment, data initially received at the security gateway 170 and stored in the database 260 may subsequently be stored in the blockchain 150 for replication to the security broker 130.

3.3 Security Gateway

In the example of FIG. 2, the security gateway 170, optionally, may have a database 260 that stores the same certificates, private keys, inventory list, and revocation list that is stored in the security broker database 210 and/or the blockchain 150. In an embodiment, the data management instructions 255 may periodically check the blockchain 150 for data directly rather than using a local database for storage. In another embodiment, the data management instructions 255 may periodically check the blockchain 150 for updated data and store the updated data in the local database 260. In an embodiment, data may be pre-programmed into the security gateway 170 or changed at the security gateway 170. For example, the inventory list may be pre-programmed at the security gateway 170 instead of at the security broker 130 for subsequent synchronization with the security broker 130 and the blockchain 150. The certificates, inventory list, and/or revocation list, and any changes to them, may be hashed and encrypted by the data management instructions 255 and stored in the blockchain 150 for subsequent verification and synchronization with the security broker database 210.

When an enterprise device 180 is ready for onboarding, internet connectivity may not be available. For example, an enterprise device 180, such as a temperature monitor, may be located in an agricultural field where no internet is available. Therefore, the enterprise device 180 may initiate a Transport Layer Security (TLS) session with a TLS server 230 associated with the security gateway 170, in an example embodiment. The enterprise device 180 may validate the TLS server 230 certificate by using a pre-installed trusted root public key. The TLS server 230 may staple an Online Certificate Status Protocol (OCSP) response, which may be used for obtaining the revocation status of a certificate.

All devices within the computer system 100, including the CA 120, security broker 130, blockchain computer 155, security gateway 170, enterprise device 180, and client device 190 may be programmed with OCSP and function in a decentralized manner such that every device may mutually validate and authenticate peer devices. The blockchain 150 may be used to determine revocation status at the decentralized edge without requiring centralized connectivity to the CA 120. Furthermore, any determination that a device has been compromised may result in updating the revocation list that is stored in the blockchain 150 to revoke the certificate of the compromised device. The change in revocation status may also be replicated to different databases.

For example, an edge device may send an OCSP check request to the security gateway 170 to check a certificate revocation status of another edge device. In an embodiment, the other edge device may also send OCSP check request to the security gateway 170 to check a certificate revocation status of the edge device. The security gateway 170 may then be used to check the revocation statuses of both edge devices' certificates. If the security gateway 170 verifies that both devices' certificates have not been revoked, then access may be granted. If the security gateway 170 determines that one or both devices' certificates have been revoked, then access may be denied.

Moreover, the blockchain 150 data may be replicated to the security broker database 210. The security broker 130 may subsequently update the CA 120 with the revocation status. In an embodiment, any CA-initiated updates to the revocation list stored at the CA 120 may prompt the security broker 130 to replicate the update to the blockchain 150 for decentralized OCSP checks.

Returning to the example of FIG. 2, the TLS server 230 may also, in turn, use inventory look-up instructions 235 to validate a MIC or birth certificate of the enterprise device 180 against the inventory list stored in the database 260. Once both the TLS server 230 and the enterprise device 180 have been validated, the enterprise device 180 may receive a pair of public and private keys stored in the blockchain 150 for use in encrypting and sending a certificate request. The enterprise device 180 may generate a Certificate Signing Request (CSR), using the public key for encryption, and send the CSR to the security gateway 170 by means of secure transport protocols. Any secure transport protocol, such as TLS, Enrollment over Secure Transport (EST), Constrained Application Protocol (CoAP), HTTP, HTTPS, 802.1x, or any other protocol, may be used. The security gateway 170 may receive, de-capsulate, and process the CSR. Subsequently, the security gateway 170 may use the data management instructions 255 to validate the request against the inventory list stored in the database 260. The CSR may be used as a standards-based protocol for device attribute interrogation for validation against the blockchain inventory list. In an embodiment, for late or early binding cases, a CSR may not be necessary since the certificate that has been or will be issued to the device has already been stored in the blockchain 150. In such cases, the CSR may be discarded after inventory validation.

For example, in FIG. 2, the enterprise device 180 may receive a pair of public and private keys from the blockchain 150 for use in encrypting and sending a certificate request. The enterprise device 180 may generate a CSR using the public key for encryption and use, for example, EST based on TLS secured CoAP to send the CSR to the security gateway 170. In an embodiment, the security gateway 170 may use EST CoAP instructions 240 to receive the CSR. Subsequently, the EST CoAP instructions 240 may send the CSR to proxying instructions 245, in an embodiment, which may unpack the CoAP payload and access the inventory look-up instructions 235 to validate the payload against the device UID stored in the database 260. The proxying instructions 245 may optionally proxy the protocol from CoAP to HTTP and send the newly proxied HTTP request to an EST HTTP server 250 associated with the security gateway 170. While the example of FIG. 2 uses CoAP and HTTP, any protocol, such as HTTP, 802.1x, or any other protocol may also be used and proxied from or to. The security gateway 170 may then use the data management instructions 255 to validate the request against the inventory list stored in the database 260.

Once the request has been validated, the security gateway 170 may enroll the device by accessing the corresponding certificate and private key stored in association with the device in the database 260 and sending the certificate and private key to the enterprise device 180. The security gateway 170 may also generate an audit log for the enrolled device.

While each of the functional components listed above is described as if located on a single computer, one or more of the components listed above may be part of and/or executed on different computers. For example, the security broker 130 may comprise a TLS server 230 computer that is separate from the EST HTTP server 250 computer.

4.0 Procedural Overview

Figure 3:
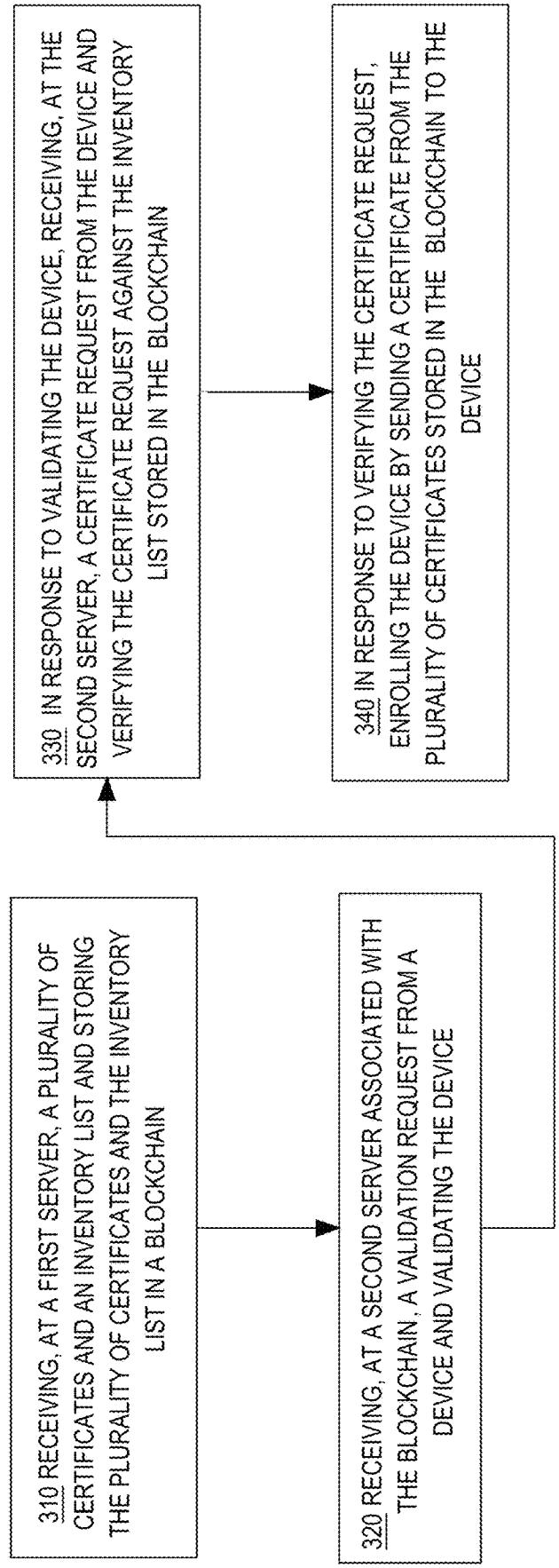
FIG. 3 illustrates algorithms or methods for providing certificate enrollment and revocation services, in an example embodiment.

FIG. 3 illustrates algorithms or methods for providing certificate enrollment and revocation services, in an example embodiment. FIG. 3 may be used as a basis to code methods 300 as one or more computer programs or other software elements that the security broker 130 and/or security gateway 170 execute or host. In an embodiment, using the approaches of this section, security broker 130 may pre-generate a certificate and private key pair by obtaining the certificate and private key from a certificate authority before device enrollment. The security gateway 170 may subsequently assign the certificate and private key to the enterprise device 180 during enrollment.

At step 310, the algorithm or method comprises receiving, at a first server, a plurality of certificates and an inventory list and storing the plurality of certificates and the inventory list in a blockchain. In an embodiment, the security broker 130 may also receive a revocation list based on the inventory list, which is stored in the blockchain. The inventory list may be pre-programmed into the security broker 130, pre-programmed into the blockchain 150 and obtained by the security broker 130, or pre-programmed into the security gateway 170 and subsequently replicated to the security broker 130 using the blockchain 150. Optionally, the inventory list may be stored in the database 210 associated with the security broker 130. In an embodiment, the security broker 130 requests and receives a plurality of certificates and their associated private keys, from a CA 120. The security broker 130 may request specific certificates with subject names for devices based on the inventory list that is stored in database 210 to implement early binding. In other embodiments, the security broker 130 may request generic certificates for later binding. These generic certificates may have generic or descriptive subjects, or no subjects at all. In some embodiments, the security broker 130 may pre-allocate blocks of certificates based on a specific purpose, such as for a specific type of device, or based on specific device information, manufacturer certificates or any other UID. The number of requests from the security broker 130 may also be based on the total number of devices on the inventory list.

In an embodiment, each of the plurality of certificates may be converted from a first format to a second format and subsequently stored in the first database or the blockchain 150 in the second format. For example, the security broker 130 may receive the certificates in a X.509 format and use the certificate handling instructions 225 to convert certificates to the PKCS7 format. The security broker 130 may subsequently store the plurality of converted certificates and/or the revocation list in a database 260 for synchronization with the security gateway 170 and the blockchain 150, or store the plurality of converted certificates directly in the blockchain 150.

In an embodiment, the algorithm or method may comprises replicating the plurality of certificates and the inventory list stored in the first database associated with the first server into a second database associated with a second server using a blockchain. In an embodiment, the inventory list, revocation list, and the certificates that are stored in the security broker 130 database 210 may be copied and stored in the security gateway 170 database 260. For example, database 210 and database 260 may be programmed with bidirectional replication and synchronization using the blockchain 150. Any data stored in the blockchain 150 may be replicated in the security broker database 210 and/or the security gateway database 260. For example, data initially received at the security broker 130 and stored in the database 210 may subsequently be stored in the blockchain 150 for replication to the security gateway database 260. In another embodiment, data initially received at the security gateway 170 and stored in the database 260 may subsequently be stored in the blockchain 150 for replication to the security broker 130. The certificates, inventory list, and revocation list stored in the synchronized database 260 may subsequently be used by various components of the security gateway 170, such as the TLS server 230 and, in an example embodiment, the EST HTTP server 250. In another embodiment, the security broker 130 and security gateway 170 may obtain data directly from the blockchain 150 rather than storing information in database 210 or database 260.

At step 320, the algorithm or method further comprises receiving, at a second server associated with the blockchain, a validation request from a device and validating the device. In an example embodiment, an enterprise device 180 that is featured in the inventory list may initiate a TLS validation session where the enterprise device 180 validates the TLS server 230 certificate using a root-of-trust public key, and the TLS server 230 validates the MIC or birth certificate of the enterprise device 180 that is stored in the inventory list in the database 260. The TLS session allows validation without internet access because the inventory list may be used as a revocation verification check; as such, the enterprise device 180 may be enrolled regardless of internet connectivity. In other embodiments, the enterprise device 180 may not be a known device featured in the inventory list, but may be pre-authenticated and subsequently added to the inventory list and validated.

At step 330, in response to validating the device, the algorithm or method further comprises receiving, at the second server, a certificate request from the device and verifying the certificate request against the inventory list stored in the blockchain. For example, after the TLS session, the security gateway 170 may receive an encrypted certificate request or CSR that was generated by the enterprise device 180. The security gateway 170 may also receive a private key, originally generated by the CA 120 and stored in the blockchain 150, for validating and decrypting the CSR. Any transport protocol may be used to send and receive the CSR and private key. The security gateway 170 may then de-capsulate and process the CSR. Processing the CSR may include reformatting the encapsulation for different transport protocols, as described in the example herein. Subsequently, the security gateway 170 may use the data management instructions 255 to validate the request against the inventory list stored in the database 260.

In an example embodiment, the enterprise device 180 may feature an EST CoAP client that sends the CSR to security gateway 170 using the CoAP protocol. The EST CoAP instructions 240 of the security gateway 170 may be programmed to receive the CSR and forward the CSR to the proxying instructions 245. Optionally, the algorithm or method may further comprises proxying the certificate request from a first transport to a second transport and sending a proxied certificate request to a third server. In an embodiment, the proxying instructions 245 may first unpack the CoAP payload and validate the payload against the device UID stored in the database 260. Subsequently, the proxying instructions 245 may proxy the CSR transport protocol encapsulation from CoAP to HTTP and send the proxied request to the EST HTTP server 250. In an example embodiment, the EST HTTP server 250 may receive the proxied certificate request and use data management instructions 255 to validate the request against the device UID stored in the database 260. While the transport protocols used in this embodiment include CoAP and HTTP, any transport protocol, such as CoAP, HTTP, HTTPS, or 802.1x may be used.

At step 340, in response to verifying the certificate request, the algorithm or method may further comprise enrolling the device by sending a certificate from the plurality of certificates stored in the blockchain to the device. In an embodiment, the security gateway 170 may act in place of the CA 120 by enrolling the enterprise device 180 locally. The security gateway 170 may enroll the enterprise device 180 by accessing a certificate and private key stored in the database 260 and/or the blockchain 150 and sending the certificate and private key to the enterprise device 180. In various embodiments, the certificate may be a specific certificate with a subject that matches a particular device due to early binding, or a generic certificate for later binding. Later binding may be implemented when the security gateway 170 issue an enrollment transaction that is verified and stored in the blockchain 150. The enrollment transaction may update the certificate state as active or in service in the blockchain 150 and bind the certificate to the enrolled enterprise device 180.

To continue the example above, once the request from step 330 is validated, the EST HTTP server 250 may enroll the enterprise device 180. To enroll the enterprise device 180, the security gateway 170 may access the corresponding certificate and private key stored in the database 260 in association with the specific enterprise device 180. The security gateway 170 may then send the certificate and private key to the enterprise device 180 using PKI. The security gateway 170 may also generate an audit log for the enrolled device to track all activities that involve the enrolled device.

In an embodiment, certificates may be revoked at the security gateway 170 and stored in the blockchain 150 or database 260 for subsequent synchronization with database 210 and the blockchain 150. For example, if a certificate expires, the security gateway 170 may be programmed to update the revocation list stored in the database 260 and/or the blockchain 150 to indicate that a particular certificate associated with a specific enterprise device 180 has been revoked. In another embodiment, if the security gateway 170 detects that a device has been tampered with, the security gateway 170 may be programmed to revoke the certificate. If any edge device detects that the security gateway 170 or another edge device has been compromised, then the certificate of the compromised security gateway or other edge device may also be revoked. The updated revocation list may be stored in the blockchain 150 and database 210 of the security broker 130. The security broker 130 may subsequently be programmed to send the updated revocation list to the CA 120.

Using the foregoing techniques, programmed computers may automatically detect, transfer, store, and utilize data in a manner that maximizes data security and data integrity while improving data delivery to and from certificate authorities and devices. The present approach utilizes an intermediary broker to request certificates from a centralized certificate authority before device enrollment and send the certificates and other related information to an intermediary gateway and a blockchain. Subsequently, the intermediary gateway acts in place of the centralized certificate authority and performs enrollment and revocation services regardless of whether the devices have uninterrupted internet connectivity. Implementations provide for a decentralized certificate authority that shifts processing burden away from the centralized certificate authorities that no longer process direct certificate requests from enrolling devices.

Moreover, the present approach can be extended to a plurality of IoT devices that are geographically distributed and separate from the enterprise environment, without implementing resource-intensive security software on or at each IoT device. Implementations also eliminate the need for internet connectivity at the time of device enrollment, thereby decreasing network traffic usage from the enrolling device.

Furthermore, the approaches disclosed herein improve data security and data integrity. The use of a blockchain 150 protects the integrity of any data stored in the blockchain 150. The nature of the blockchain 150 also ensures that each new block of data is linked to the previous block, creating an improved method of documenting changes and rejecting unapproved changes. Consequently, the blockchain 150 functions as a secure backup for sensitive identity information with high Byzantine fault tolerance.

5.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
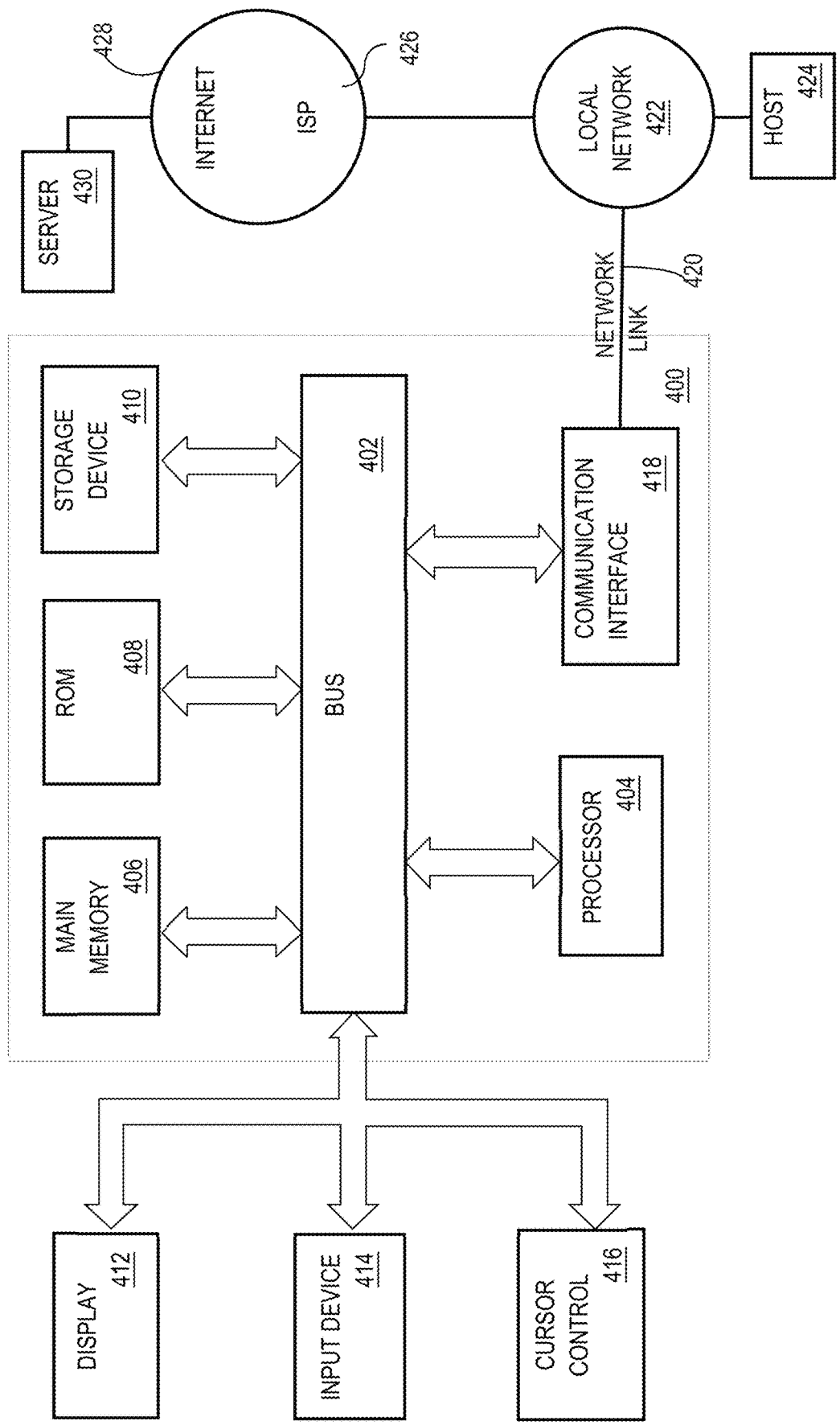
FIG. 4 illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), a liquid crystal display (LCD), or any other display for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world-wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
    receiving, at a first server, a plurality of certificates and a device inventory list and storing the plurality of certificates and the device inventory list in a blockchain;
    receiving, at a second server associated with the blockchain, a validation request from a device and validating the device to determine that the device is not compromised;
    in response to validating the device, receiving, at the second server, a certificate request from the device and verifying the certificate request against the device inventory list stored in the blockchain; and
    in response to verifying the certificate request, enrolling the device by sending a certificate from the plurality of certificates stored in the blockchain to the device.

2. The method of claim 1, further comprising:
    in response to receiving, at the first server, the plurality of certificates and the device inventory list, storing the plurality of certificates and the device inventory list in a first database associated with the first server; and
    replicating the plurality of certificates and the device inventory list stored in the first database into a second database associated with the second server using the blockchain.

3. The method of claim 1, further comprising:
    in response to receiving, at the first server, the plurality of certificates, converting the plurality of certificates from a first format to a second format; and
    wherein storing the plurality of certificates in the blockchain comprises storing the plurality of certificates in the second format.

4. The method of claim 1, further comprising:
    receiving, at the first server, a revocation list based on the device inventory list and storing the revocation list in the blockchain.

5. The method of claim 1, further comprising:
    in response to receiving the certificate request from the device, proxying the certificate request from a first transport to a second transport.

6. The method of claim 1, further comprising:
    in response to verifying the certificate request, generating an audit log associated with the device.

7. The method of claim 1, wherein validating the device comprises validating against the device inventory list stored in the blockchain.

8. The method of claim 1, wherein receiving, at the first server, the plurality of certificates comprises receiving the plurality of certificates from a certificate authority.

9. One or more non-transitory computer-readable storage media storing one or more sequences of program instructions which, when executed by one or more computing devices, cause performing:
    receiving, at a first server, a plurality of certificates and a device inventory list and storing the plurality of certificates and the device inventory list in a blockchain;
    receiving, at a second server associated with the blockchain, a validation request from a device and validating the device to determine that the device is not compromised;
    in response to validating the device, receiving, at the second server, a certificate request from the device and verifying the certificate request against the device inventory list stored in the blockchain; and
    in response to verifying the certificate request, enrolling the device by sending a certificate from the plurality of certificates stored in the blockchain to the device.

10. The one or more non-transitory computer-readable media of claim 9, further comprising instructions that, when executed by the one or more computing devices, cause:
    in response to receiving, at the first server, the plurality of certificates and the device inventory list, storing the plurality of certificates and the device inventory list in a first database associated with the first server; and
    replicating the plurality of certificates and the device inventory list stored in the first database into a second database associated with the second server using the blockchain.

11. The one or more non-transitory computer-readable media of claim 10, further comprising instructions that, when executed by the one or more computing devices, cause:

in response to receiving, at the first server, the plurality of certificates, converting the plurality of certificates from a first format to a second format; and wherein storing the plurality of certificates in the blockchain comprises storing the plurality of certificates in the second format.

12. The one or more non-transitory computer-readable media of claim 11, further comprising instructions that, when executed by the one or more computing devices, cause:

receiving, at the first server, a revocation list based on the device inventory list and storing the revocation list in the first database; and replicating the revocation list stored in the first database into the second database associated with the second server using the blockchain.

13. The one or more non-transitory computer-readable media of claim 12, further comprising instructions that, when executed by the one or more computing devices, cause:

in response to receiving the certificate request from the device, proxying the certificate request from a first transport to a second transport.

14. The one or more non-transitory computer-readable media of claim 13, further comprising instructions that, when executed by the one or more computing devices, cause:

in response to verifying the certificate request, generating an audit log associated with the device.

15. The one or more non-transitory computer-readable media of claim 14, wherein validating the device comprises validating against the device inventory list stored in the blockchain.

16. The one or more non-transitory computer-readable media of claim 15, wherein receiving, at the first server, the plurality of certificates comprises receiving the plurality of certificates from a certificate authority.

17. A computer system comprising:
one or more processors;
a computer-readable storage media coupled to the one or more processors;
a memory coupled to the computer-readable storage media and storing instructions which, when executed, cause the one or more processors to:
  receive, at a first server, a plurality of certificates and a device inventory list and storing the plurality of certificates and the device inventory list in a blockchain;
  receive, at a second server associated with the blockchain, a validation request from a device and validating the device to determine that the device is not compromised;
  in response to validating the device, receive, at the second server, a certificate request from the device and verify the certificate request against the device inventory list stored in the blockchain; and
  in response to verifying the certificate request, enroll the device by sending a certificate from the plurality of certificates stored in the blockchain to the device.

18. The computer system of claim 17, wherein the memory stores further instructions which, when executed, cause the one or more processors to:

in response to receiving, at the first server, the plurality of certificates and the device inventory list, store the plurality of certificates and the device inventory list in a first database associated with the first server; and replicate the plurality of certificates and the device inventory list stored in the first database into a second database associated with the second server using the blockchain.

19. The computer system of claim 18, wherein the memory stores further instructions which, when executed, cause the one or more processors to:

in response to receiving, at the first server, the plurality of certificates, convert the plurality of certificates from an X.509 format to a PKCS7 format; and wherein to store the plurality of certificates in the first database comprises storing the plurality of certificates in the PKCS7 format.

20. The computer system of claim 18, wherein the memory stores further instructions which, when executed, cause the one or more processors to:

receive, at the first server, a revocation list based on the device inventory list and store the revocation list in the first database; and replicate the revocation list stored in the first database into the second database associated with the second server using the blockchain.

21. The computer system of claim 18, wherein the memory stores further instructions which, when executed, cause the one or more processors to:

in response to verifying the certificate request, generate an audit log associated with the device.

22. The computer system of claim 18, wherein the memory stores further instructions which, when executed, cause the one or more processors to:

in response to receiving the certificate request from the device, proxy the certificate request from a first transport to a second transport.

23. The computer system of claim 22, wherein the first transport of the certificate request is a Constrained Application Protocol (CoAP), and wherein the second transport of the certificate request is a Hypertext Transfer Protocol (HTTP).

* * * * *